United States Patent [19]

Frohwerk

[11] Patent Number: 4,481,155
[45] Date of Patent: Nov. 6, 1984

[54] MULTI-CELL TILES WITH OPENINGS FOR USE IN A LIQUID COOLING TOWER

[75] Inventor: Paul A. Frohwerk, Granbury, Tex.

[73] Assignee: Ceramic Cooling Tower Company, Fort Worth, Tex.

[21] Appl. No.: 543,413

[22] Filed: Oct. 19, 1983

[51] Int. Cl.³ .............................................. B01F 3/04
[52] U.S. Cl. ...................................... 261/94; 52/604; 261/DIG. 11; 261/DIG. 72
[58] Field of Search ...................... 261/94-98, 261/111, 112, DIG. 11, DIG. 72; 210/150, 151; 52/302, 303, 604, 602, 607

[56] References Cited

U.S. PATENT DOCUMENTS

| 556,040 | 3/1896 | Alberger | 261/DIG. 72 |
|---|---|---|---|
| 1,947,777 | 2/1934 | Huff et al. | 261/DIG. 72 |
| 2,183,657 | 12/1939 | Page | 261/DIG. 72 |
| 2,911,204 | 11/1959 | Malone | 261/DIG. 72 |
| 3,751,017 | 8/1973 | Lemmens | 261/111 |
| 3,796,657 | 3/1974 | Pretorius et al. | 261/DIG. 72 |
| 4,195,043 | 3/1980 | Foote et al. | 261/DIG. 72 |
| 4,382,046 | 5/1983 | Frohwerk | 261/94 |

FOREIGN PATENT DOCUMENTS 948407  8/1982  U.S.S.R. .................. 261/DIG. 72

Primary Examiner—Richard L. Chiesa

[57] ABSTRACT

Rectangular clay tiles for a liquid cooling tower are provided with openings to increase the heat and mass transfer which is provided by the tiles. Each rectangular tile includes four side walls and inner partitions or webs which provide a plurality of vertically extending open cells. Each side wall and each partition is provided with at least one horizontal opening for each cell formed by that side wall or partition, and liquid and air can flow into or out of the cells through the openings.

25 Claims, 15 Drawing Figures

MULTI-CELL TILES WITH OPENINGS FOR USE IN A LIQUID COOLING TOWER

BACKGROUND

This invention relates to multi-cell tiles which are used in the heat and mass transfer section of a liquid cooling tower, and, more particularly, to tiles which are provided with openings for increasing the heat and mass transfer which is provided by the tiles.

Cooling towers are used to cool liquid by contact with air. The liquid is allowed to flow downwardly through the tower, and a countercurrent flow of air is drawn through the falling liquid by various means. A common application of liquid cooling towers is for cooling water (dissipating waste heat) used in electrical generating and process plants and industrial and institutional air conditioning systems.

One type of prior art cooling tower utilizes stacked layers of clay tiles. The tiles are formed by extruding clay to form a tube having a generally rectangular cross-section and a plurality of axially extending cells. The extruded tube is transversely severed by cutting wires to form individual tiles having an axial length of about five to eight inches (12.7 to 20.3 cm.). The rectangular tiles may have transverse dimensions of about 9 to 10 inches (22.9 to 25.4 cm.) and two to five cells on each side. Thereafter the tiles are hardburned to form a hard, structural tile. The tiles are stacked in layers so that the cells of the tiles extend vertically. The tiles of each layer are stacked directly on the tiles of the previous layer, and the tiles of each layer are preferably offset so that the cells of one tile are not vertically aligned with the cells of the tiles above and below. The tiles within each layer are spaced laterally from adjacent tiles of the same layer.

The tiles are stacked within a confining wall, and the water or other liquid to be cooled is introduced to the top of the stack by, for example, spray nozzles. The water flows downwardly over the walls and through the cells of the tiles and through the spaces between adjacent tiles of the same layer. Air flow is induced upwardly through the stack countercurrently to the water. The air helps to break the water into droplets, and the contact between the air and the water results in heat and mass transfer from the water to the air.

U.S. Pat. No. 4,382,046 describes an improved cooling tower in which spacers are inserted between adjacent layers of tiles. The spacers create a vertical space of from one to four inches (2.5 to 10.2 cm.) between the layers of tile, and air and water can therefore flow transversely to some extent between adjacent layers. The pressure drop or the resistance of air flow through the stack is thereby reduced. The use of layers of spacers also results in better heat and mass transfer between the water and the liquid. The spaced layers therefore enable the required air to be induced with less energy while increasing the transfer efficiency of the cooling tower or enable the size of the cooling tower to be decreased without decreasing the cooling capacity.

SUMMARY OF THE INVENTION

I have found that the efficiency and the cooling rate of the tiles can be significantly increased by providing openings in the side walls and partitions of the tiles so that air and water can flow horizontally into and out of the cells. It is believed that the openings help to break up the water and decrease the resistance to air flow through the tiles. The tiles with the openings can be stacked without spacers, and the elimination of the spacers and the weight removed from the tiles by the openings result in substantial savings in weight.

DESCRIPTION OF THE DRAWING

The invention will be explained in conjunction with an illustrative embodiment shown in the accompanying drawing, in which.

DESCRIPTION OF SPECIFIC EMBODIMENTS

The invention will be explained in conjunction with a water cooling tower assembly which is a mechanical draft type of tower used for cooling water for an air conditioning system. Such a cooling tower is illustrated and described in U.S. Pat. No. 4,382,046, and this disclosure is incorporated herein by reference. It will be understood, however, that the invention can be used in other types of cooling towers, for example, natural draft, chimney-type towers which are used in electrical generating plants.

Figure 1:
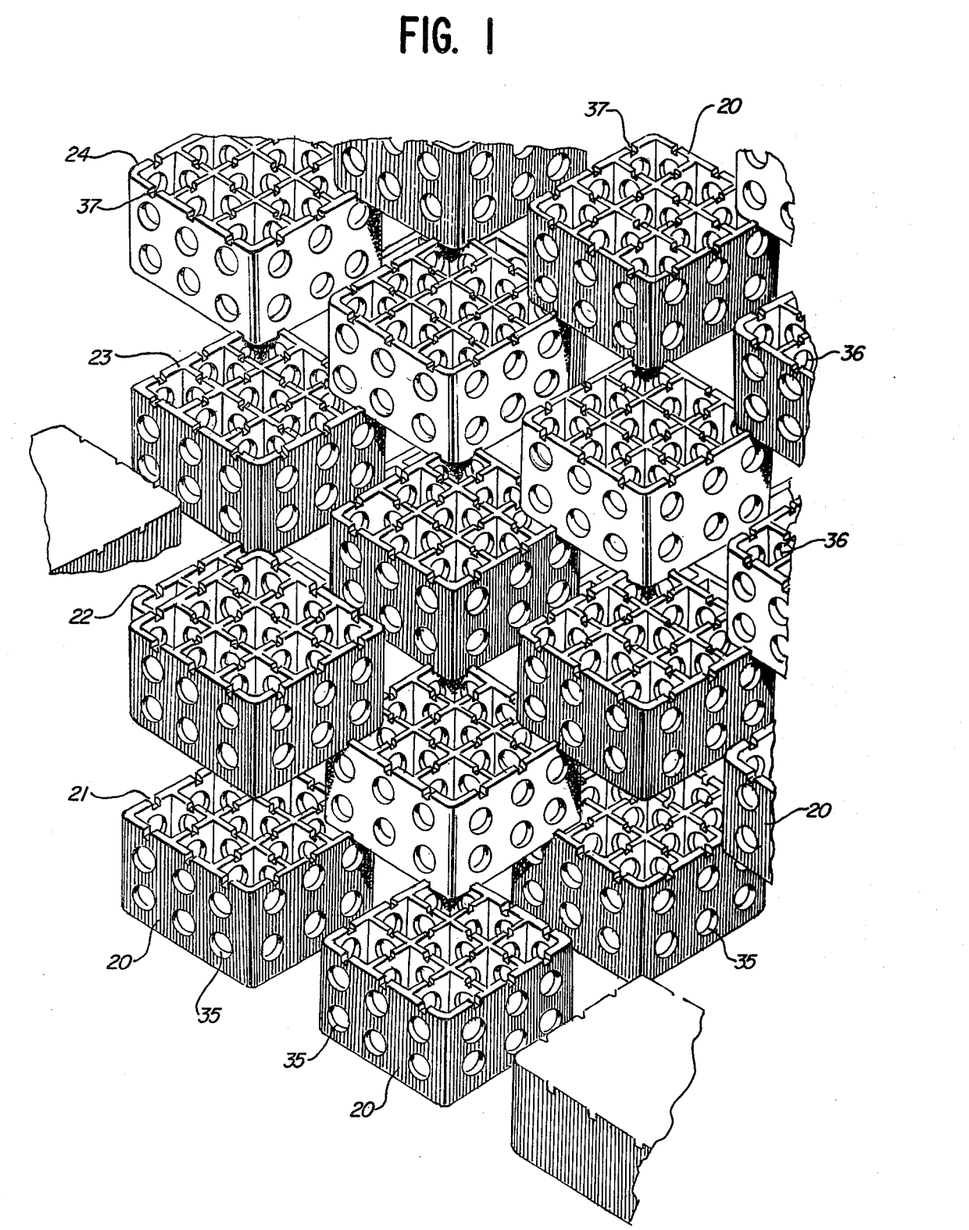
FIG. 1 is a fragmentary perspective view of a plurality of stacked layers of open-celled tiles with openings which are formed in accordance with the invention.
Figure 2:
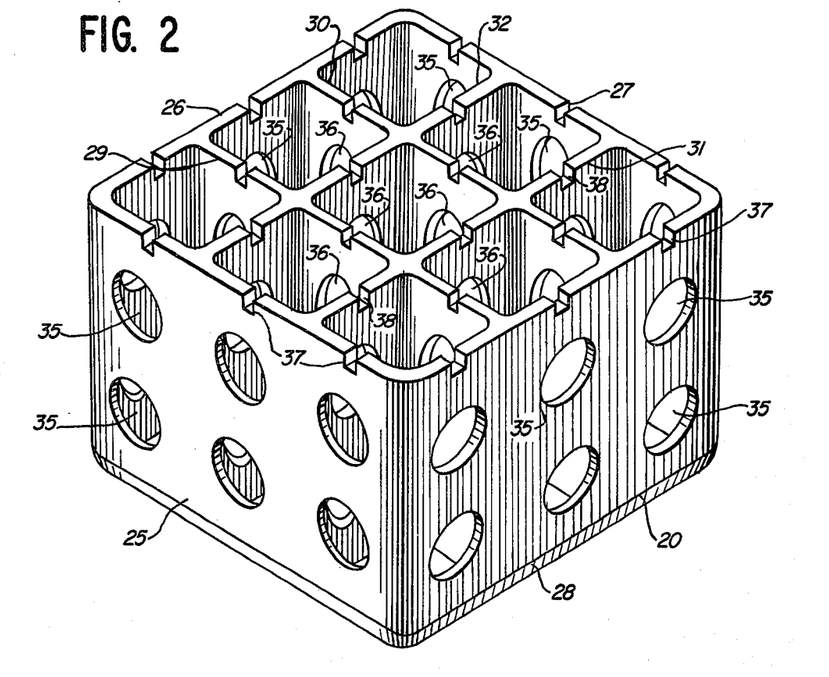
FIG. 2 is a perspective view of one of the tiles of FIG. 1.

FIG. 1 illustrates a portion of the heat and mass trasfer section of the cooling tower. The heat and mass transfer section includes a plurality of rectangular open-celled clay tiles 20 which are stacked to form horizontal layers 21, 22, 23, 24, etc. (see also FIG. 7).

Figure 3:
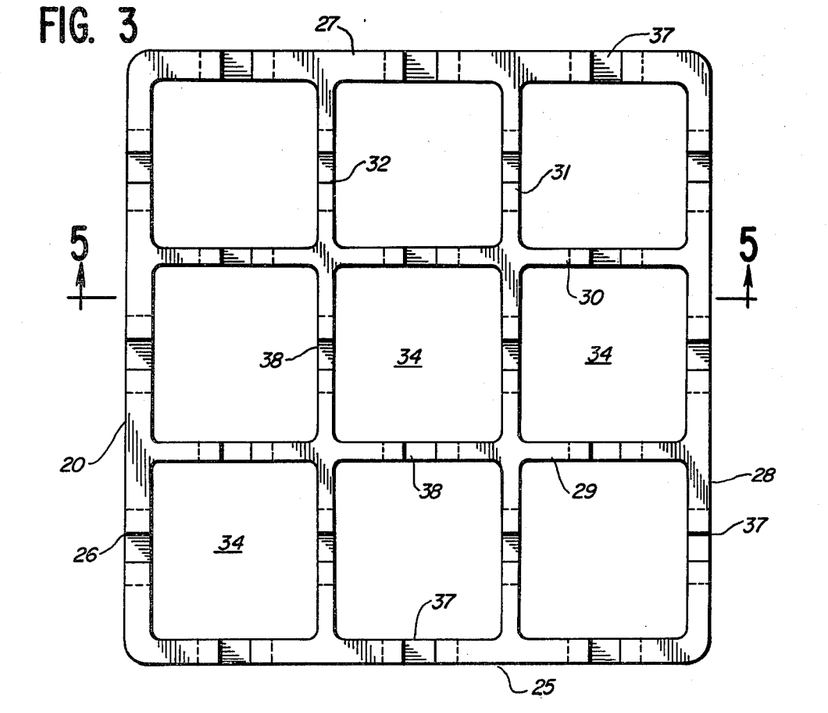
FIG. 3 is a top plan view of the tile of FIG. 2.
Figure 4:
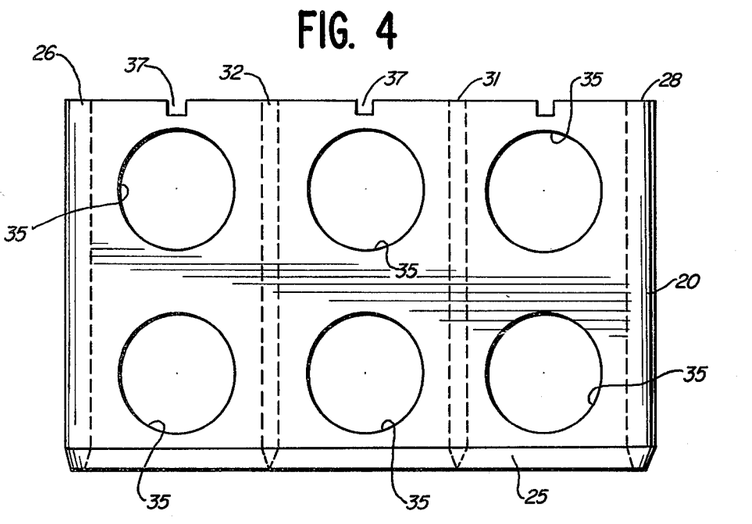
FIG. 4 is a side elevational view of the tile of FIG. 2.
Figure 5:
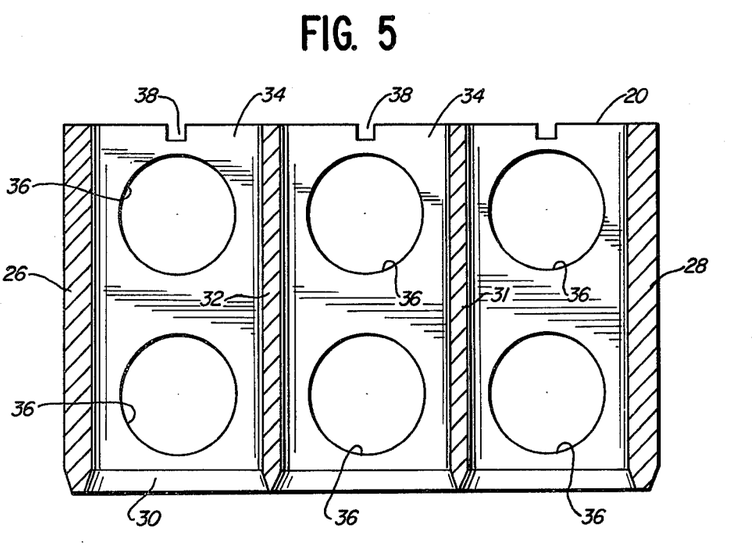
FIG. 5 is a sectional view taken along the line 5—5 of FIG. 3.

Referring to FIGS. 2-5, each of the tiles 20 is generally rectangular in horizontal cross section and includes four side walls 25, 26, 27, and 28, two partitions or webs 29 and 30 which extend perpendicularly between the side walls 26 and 28, and two partitions or webs 31 and 32 which extend perpendicularly between the side walls 25 and 27 and which intersect the partitions 29 and 30. The four intersecting partitions and the side walls form nine vertically extending cells or open spaces 34 (FIG. 3).

Each of the side walls 25-28 is provided with a pair of vertically spaced openings 35 for each of the cells which are bounded by that side wall. Similarly, each of the partitions 29-32 is provided with a pair of vertically spaced openings 36 for each of the cells which are bounded by that partition. Notches 37 and 38 are formed in the upper edges of the side walls and partitions, respectively, and the centers of the cells. The bottom edges of the side walls and partitions are tapered as shown best in FIG. 5. In one specific embodiment each tapered edge formed an included angle of about 40°.

The tiles are preferably formed as previously described by transversely cutting an extruded rectangular tube of clay. The tube is extruded to form the cells 34, and the distance between the cutters determines the vertical or axial height of the tiles. While the tiles are still soft, the openings 35 and 36 and the notches 37 and 38 are cut or punched from the side walls and partitions. The openings in the side walls and the partitions are horizontally aligned, and the holes and notches can be made by moving a punch horizontally through the walls and the paritions. After cutting and punching, the tiles are hardburned to form a hard material having low water absorbance.

The side walls and partitions can be supported during the punching operation by inserting the tile into a box or frame which provides supporting walls for the vertical surfaces of the side walls and partitions. The frame includes rectangular projections which would extend upwardly through the cells 35. The supporting walls are provided with openings through which the punch is moved to make the openings and notches 35-38.

Each pair of supporting walls of the frame can be joined by a V-shaped bottom wall so that the tapers on the bottom edges of the side walls and partitions can be formed by pushing the tile against the bottom wall. The frame is advantageously sized so that a pair of vertically stacked tiles can be inserted into the frame. The tapers on the bottom tile are formed by the bottom wall of the frame, and the tapers on the top tile can be formed by the top wall or cover of the frame. A single punch can simultaneously form a notch in both tiles by inserting the punch through the stacked tiles at their abutting edges.

The particular embodiment of tile illustrated in FIGS. 1-7 is square. The height or vertical dimension of the tile is six inches (15.24 cm.) and the length of each of the side walls is 10 inches (25.4 cm.). Each of the side walls is 7/16 inch (1.1 cm.) thick, and each partition is ¼ inch (0.64 cm.) thick. The cells were also square and had transverse dimensions of 2⅞ inches (7.3 cm.) by 2⅞ inch (7.3 cm.). The diameter of the openings 35 and 36 is two inches (5.08 cm.).

The tiles 20 are stacked in a cooling tower on top of a first course or layer of rectangular open-celled tiles which are supported by cast iron lintels as described in U.S. Pat. No. 4,382,046. The tiles of the first layer may or may not have the openings in the side walls and the partitions.

Figure 6:
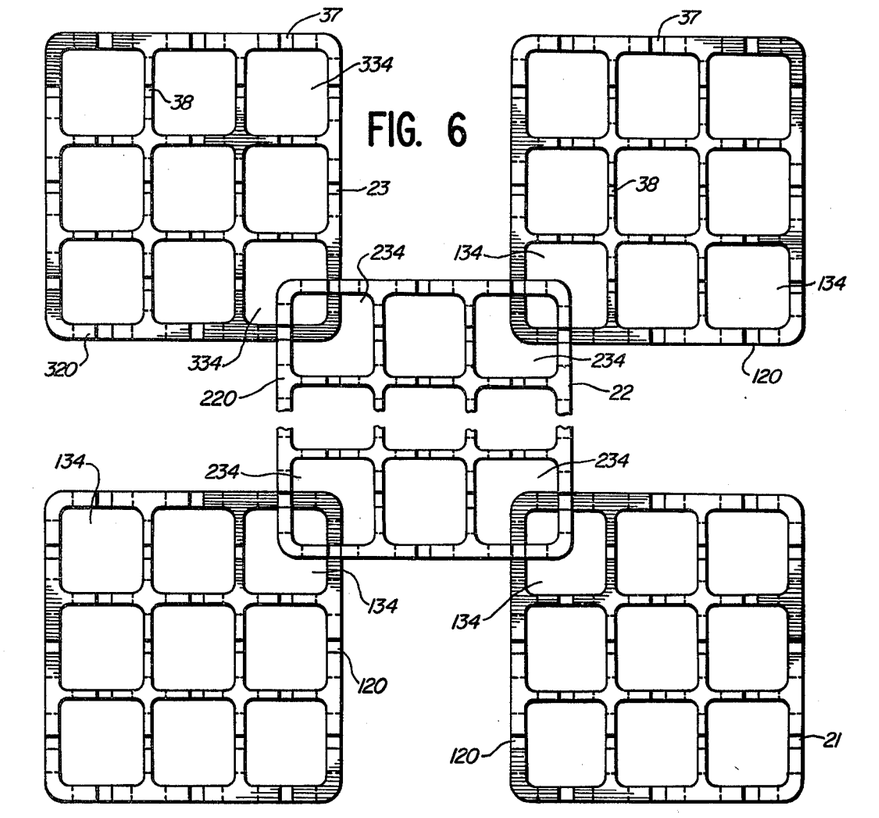
FIG. 6 is a top plan view, partially broken away, of tiles from three of the layers of FIG. 1.
Figure 7:
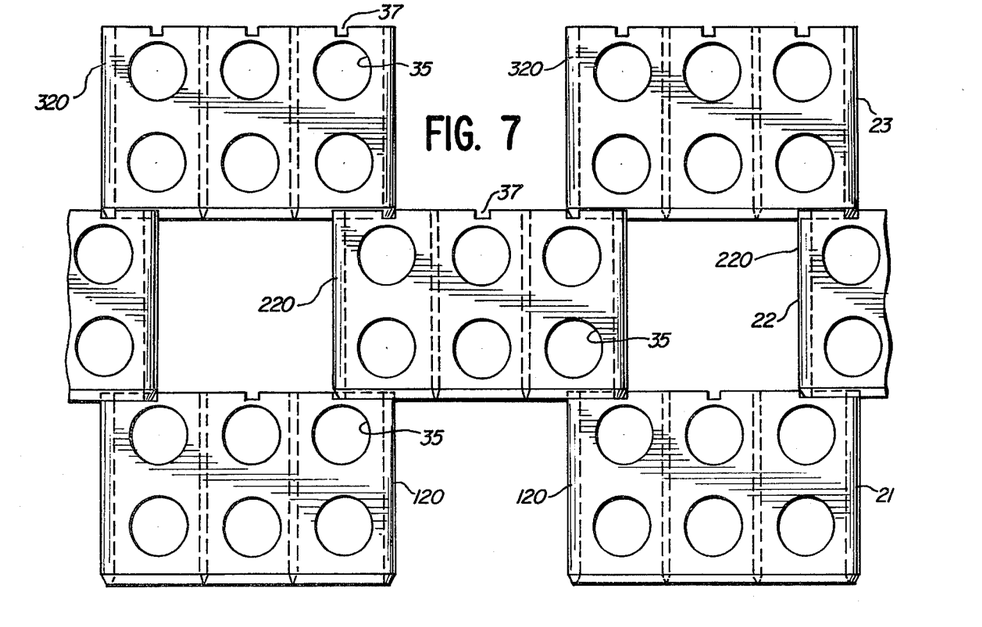
FIG. 7 is a fragmentary side elevational view of three of the layers of FIG. 1.

The preferred method of stacking the square tiles 20 is illustrated in FIGS. 6 and 7. Adjacent tiles of each layer are spaced apart a distance so that the corner cells of the tiles of the next layer partially overlap the corner cells of the lower layer. Referring to FIGS. 6 and 7, the tiles 120 are in one layer, the tiles 220 are in the next layer, and the tiles 320 are in the third layer. The corner cells 234 of the tiles 220 partially overlap the corner cells 124 of the next lower layer, and the corner cells 234 are themselves partially overlapped by the corner cells 334 of the next higher layer. The tiles 320 are vertically aligned with the tiles 120. This stacking arrangement is continued throughout the heat and mass transfer section of the cooling tower. However, the tiles of the top layer, which are positioned just below the water distribution pipes, are preferably spaced closer together and randomly overlap the next lower layer.

The preferred overlapping arrangement of the tiles illustrated in FIG. 7 is achieved by positioning a corner of a tile so that the side walls which form the corner lie midway between a side wall and an adjacent partition of a lower tile. In other words, each corner is generally vertically aligned with the center of the corner cells of the tiles above and below. This helps to prevent vertical chimneys through which air and water could flow vertically through the stack. In this position the bottom edges of the side walls of one tile are inserted into the notches 37 in the side walls of a lower tile. The notches act as positioning and aligning means and insure that the tiles are properly positioned with a minimum of effort.

It will be understood that the precise stacking arrangement illustrated cannot be maintained at the sides of the cooling tower. Tiles can be split so that partial tiles can fill any gaps which might otherwise occur between a side edge of a layer and a side wall of the cooling tower so that the edge tiles of the next layer are fully supported.

The tiles 20 provide substantially increased efficiency over the tiles and spacers described in U.S. Pat. No. 4,382,046. The tiles 20 are stacked without the spacers which are described in said patent, and the weight saved by eliminating the spacers and the weight saved by eliminating the tile material at the openings 35 and 36 result in a substantially lighter cooling tower. Weight is a particularly important consideration for a roof-mounted cooling tower. The openings 35 and 36 also permit air and water to be distributed horizontally through the openings and increase the ability of the tiles to break up the water for increased cooling efficiency. The openings also reduce the air resistance and pressure drop of the heat and mass transfer section.

The tapered lower edges of the side walls and partitions of the tiles also reduce air resistance. The tapered edges provide a streamlined shape for the air, which flows upwardly through the stacked tiles, and eliminate the ragged burs which are usually created when the extruded clay tube is cut transversely to form the tiles.

The combined effect of the increased heat and mass transfer of the tiles and the reduced pressure drop will typically reduce the horsepower requirement of the cooling tower by up to 10% and reduce the weight by up to 60%. For example, for two cooling tower tile fills, one fill comprised of tiles without the openings 35 and 36 and including the spacers as described in U.S. Pat. No. 4,382,046 and the other fill comprised of tiles with the openings 35 and 36 but without the spacers, both fills having the same total energy requirements (i.e., pumping and fan power requirements), the fill with the tiles having the openings 35 and 36 will be about 60% lighter. In general, the economics of a cooling tower using the tiles described herein will be increased more than 30% because of less clay material, freight savings, cheaper installation cost in the field, etc.

Figure 8:
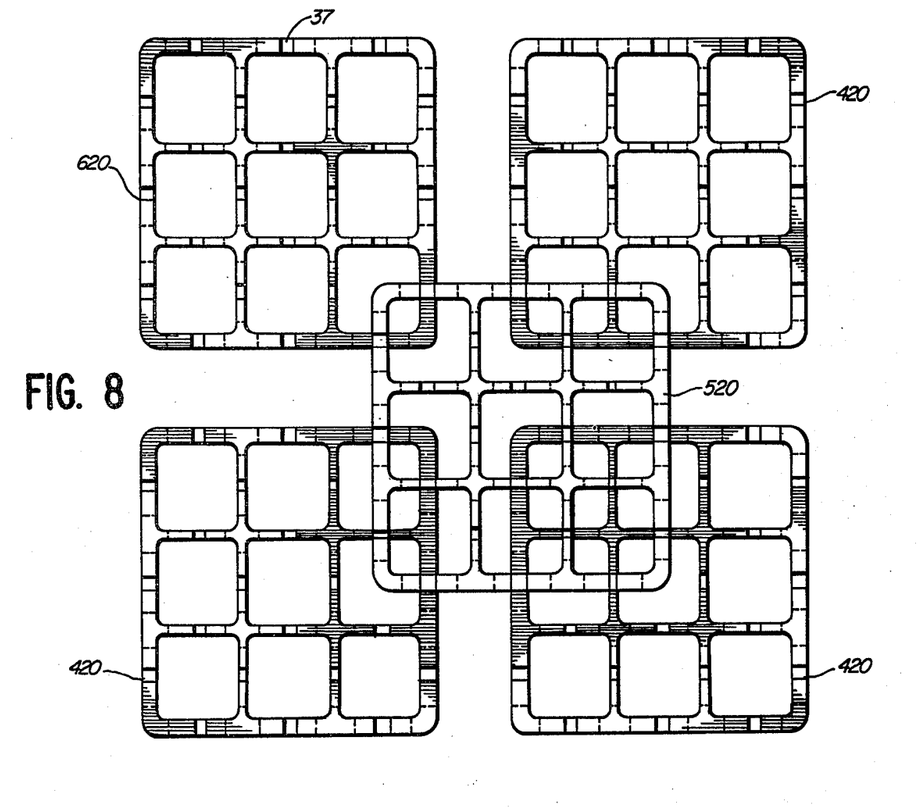
FIG. 8 is a top plan view similar to FIG. 6 showing an alternate stacking arrangement.
Figure 9:
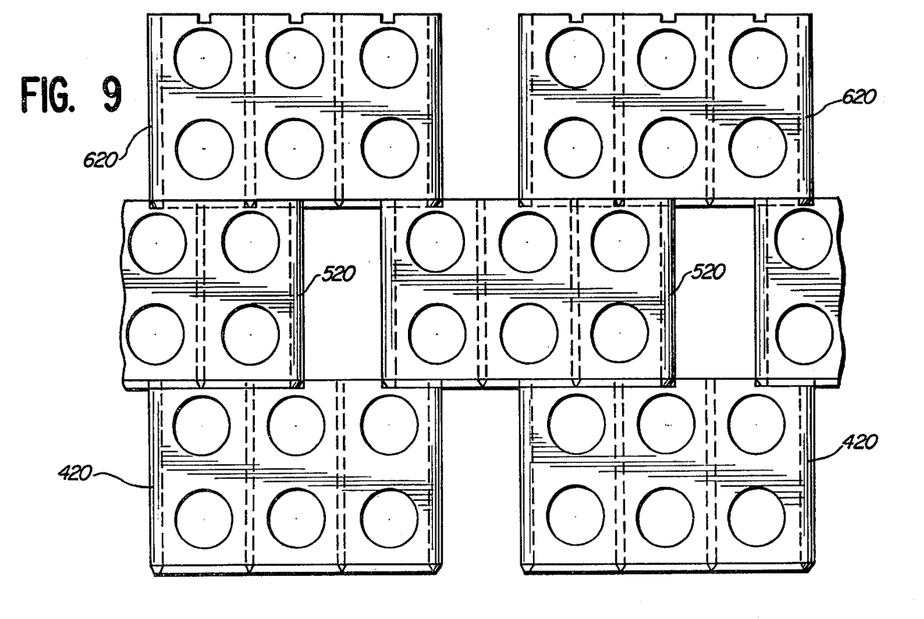
FIG. 9 is a fragmentary side elevational view of the stacking arrangement of FIG. 8.

FIGS. 8 and 9 illustrate an alternate stacking arrangement for the tiles 20. The tiles 420 are in the lowest layer, the tiles 520 are in the next layer, and the tiles 620 are in the highest layer. Referring to FIG. 8, the lower left corner of each tile is centered over the middle cell on the right side of the next lower tile. The upper left corner is centered over the corner cell of the next lower tile. The upper right corner is centered over the middle bottom tile of the next lower tile, and the lower right corner is centered over the middle cell of the next lower layer. The tiles of every other layer are superimposed over each other. The lower edges of each tile are positioned in the notches 37 and 38 of the next lower tiles to insure that the intersections of the side walls and the partitions are over the centers of the cells of the lower tiles.

Figure 10:
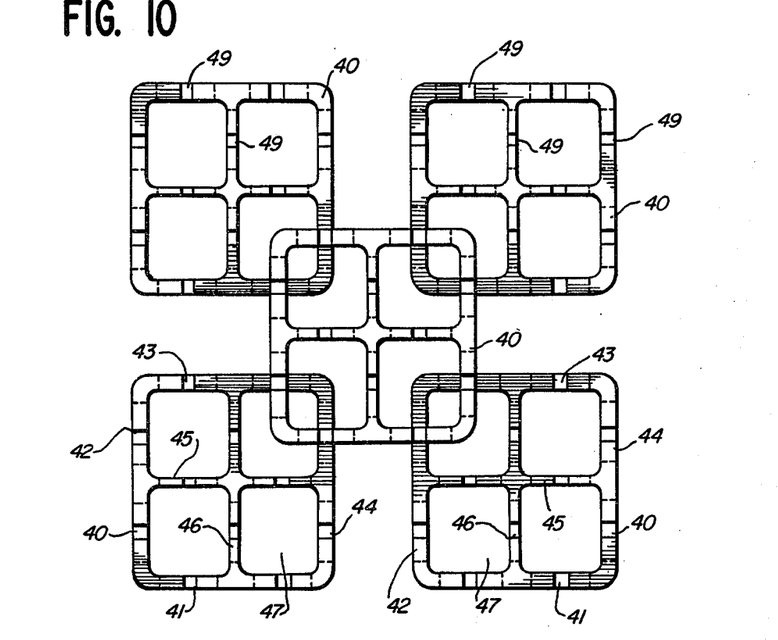
FIG. 10 is a top plan view similar to FIG. 6 showing square four-cell tiles.
Figure 11:
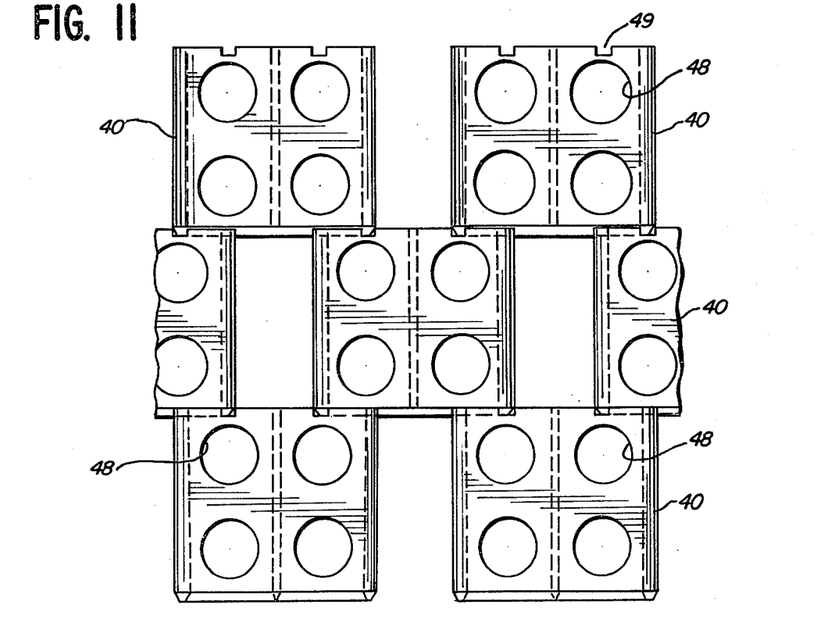
FIG. 11 is a fragmentary side elevational view of the stacking arrangement of FIG. 10.

A square four-cell tile 40 is illustrated in FIGS. 10 and 11. Each tile includes four side walls 41, 42, 43, and 44 and two intersecting partitions 45 and 46 which form cells 47. Each side wall is provided with a pair of vertically spaced openings 48 for each cell, and each partition is provided with a pair of vertically spaced openings which permit air and water to flow horizontally between the cells. The upper edges of the tiles are provided with notches 49, and the lower edges are tapered as previously described.

The tiles 40 are stacked in a manner similar to the nine-cell tiles illustrated in FIGS. 6 and 7. Each corner of each tile is centered over a corner cell of a tile of the next lower layer, and the notches 49 insure that the tiles are properly positioned.

Figure 12:
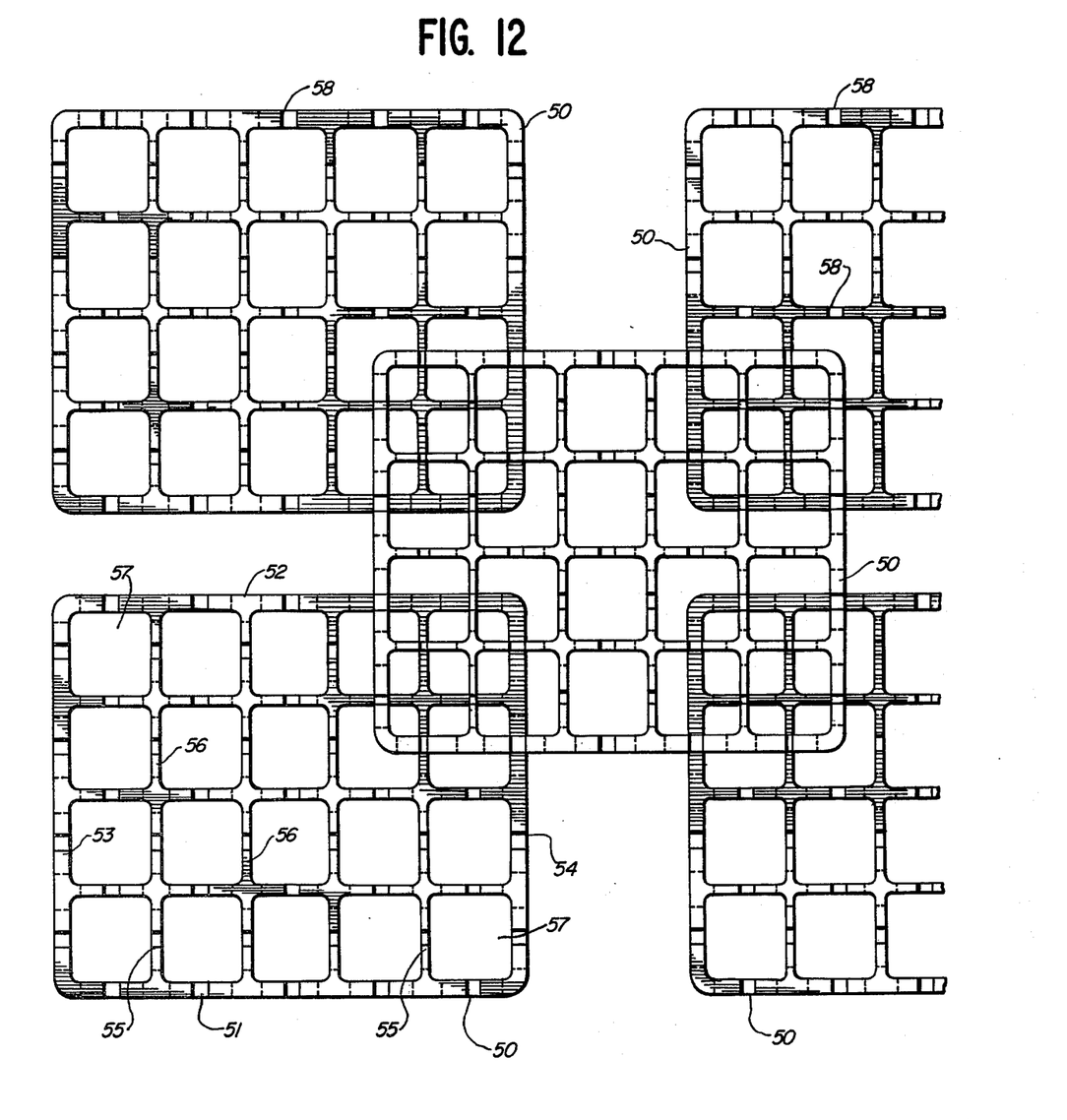
FIG. 12 is a fragmentary top plan view of a stacking arrangement for rectangular tiles.

FIG. 12 illustrates rectangular tiles 50 which have five cells in one direction and four cells in the other direction. Each tile has a pair of long side walls 51 and 52 and a pair of shorter side walls 53 and 54. Four partitions 55 extend perpendicularly between the side walls 51 and 52, and three partitions 56 extend perpendicularly between the side walls 53 and 54 to form cells 57. Each of the side walls and the partitions is provided with a pair of vertically spaced openings for each cell and with notches 58 aligned with the centers of the cells.

In the stacking arrangement illustrated in FIG. 12, each corner of each cell is positioned over the center of the second diagonally inward cell of the next lower layer.

Figure 13:
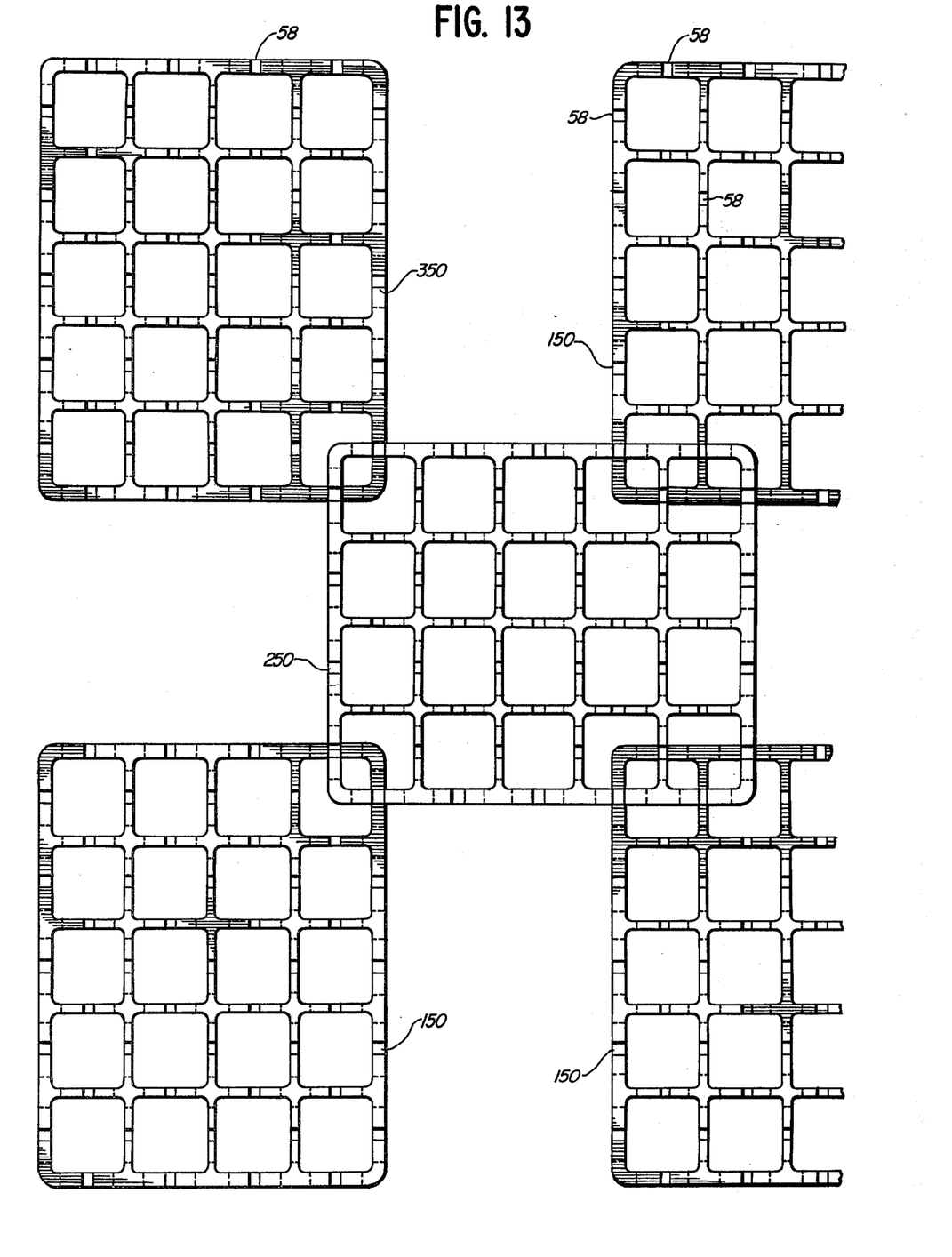
FIG. 13 is a fragmentary top plan view of another stacking arrangement for rectangular tiles.

FIG. 13 illustrates an alternate stacking arrangement for the rectangular twenty-cell tiles 50. The tiles 150 are in the first layer, the tile 250 is in the second layer, and the tile 350 is in the third layer. The upper and lower left corners of the tile 250 are centered over the corner cells of tiles in the next lower layer. The upper and lower right corners of the tile 250 are centered over the second cells of tiles in the next lower layer. The tiles of every other layer are superimposed over each other.

The foregoing stacking arrangements are only several of the various arrangements which can be used with various sized tile. It will be understood that many other arrangements can be used. In general, moving the tiles of each layer closer together so that more cells of the next lower layer are overlapped causes better heat and mass transfer because the freedom of the air and water to travel vertically is reduced and the breakup of the water is increased. However, the weight of the fill is greater and the air resistance is greater.

Figure 14:
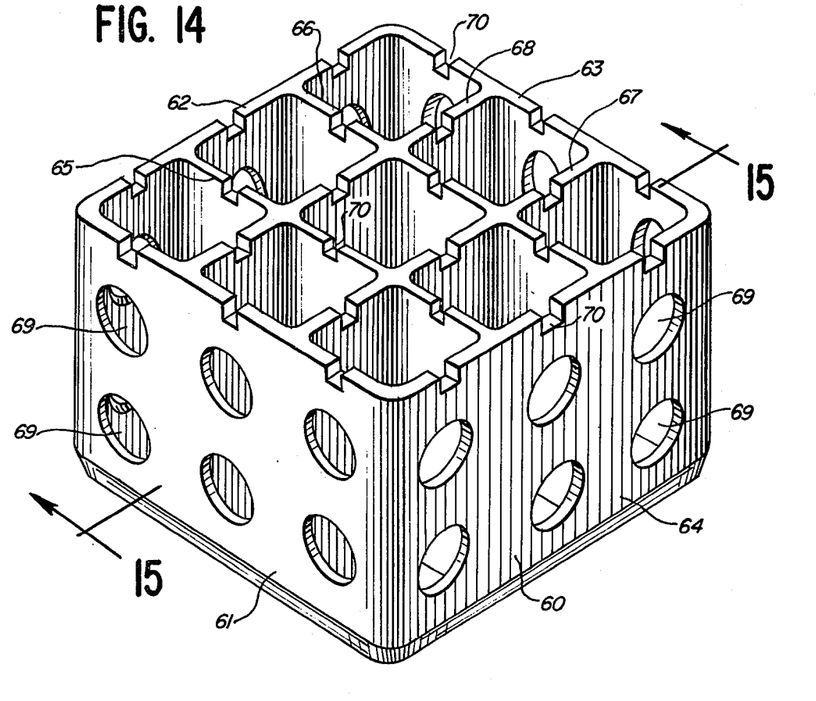
FIG. 14 is a perspective view of a tile having openings in the side walls but not in the partitions.
Figure 15:
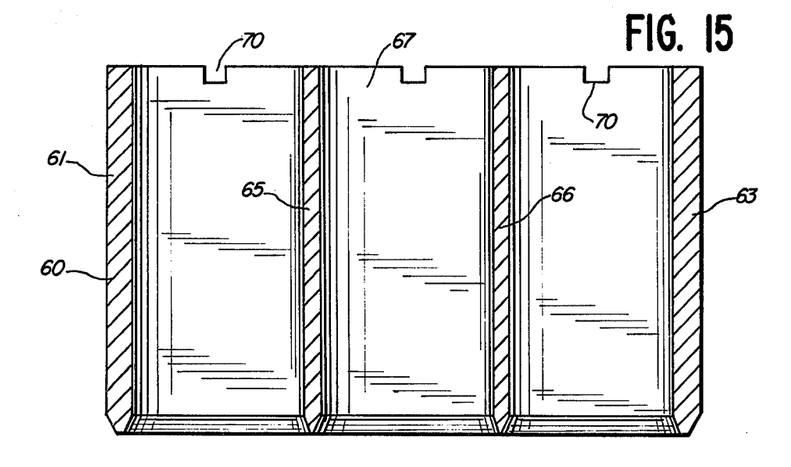
FIG. 15 is a sectional view taken along the line 15—15 of FIG. 14.

A modified square nine-cell tile 60 is illustrated in FIGS. 14 and 15. The tile 60 includes four side walls 61, 62, 63, and 64 and four intersecting partitions 65, 66, 67, and 68. The side walls 61-64 are provided with two vertically spaced openings 69 for each cell, but the partitions 65-68 are not provided with openings. Notches 70 are provided in the upper edges of the side walls and partitions.

Similarly, the openings in the partitions of the other tiles which have been described can be omitted. However, I have found that openings in the partitions not only reduce the weight of the tile but result in better heat and mass transfer and less air resistance.

It will be appreciated from the foregoing description that many different sized tiles can be provided. For example, tiles can be formed with from two to four cells on one side and from two to five cells on the other side, for a total of from four to twenty cells. These tiles can be stacked in a number of different arrangements depending upon the transfer characteristics, air resistance, and fill weight desired.

While in the foregoing specification a detailed description of specific embodiments of the invention was set forth for the purpose of illustration, it will be understood that many of the details herein given may be varied considerably by those skilled in the art without departing from the spirit and scope of the invention.

I claim:

1. A rectangular tile for the heat and mass transfer section of a liquid cooling tower comprising a first pair of generally parallel side walls having upper and lower edges and a second pair of generally parallel side walls having upper and lower edges which extend between the side walls of said first pair, at least one partition extending between the side walls of said first pair, and at least one partition extending between the side walls of said second pair and intersecting the first-mentioned partition whereby a plurality of cells are formed by the side walls and the partitions, each of said walls having at least one opening therethrough which lies between the upper and lower edges thereof and is surrounded by the side wall for each of the cells which are formed by that side wall whereby air and liquid can flow into and out of the cells through the openings in the side walls.

2. The tile of claim 1 in which each of the partitions has upper and lower edges and at least one opening therethrough which lies between the upper and lower edges thereof and is surrounded by the side wall for each pair of cells which are formed on opposite sides of the partition whereby air and liquid can flow into and out of the cells through the openings in the partitions.

3. The tile of claim 1 in which at least two parallel partitions extend perpendicularly between the side walls of said first pair and at least two parallel partitions extend perpendicularly between the side walls of said second pair and intersect said first mentioned parallel partitions, each of the partitions having upper and lower edges and at least one opening therethrough which lies between the upper and lower edges thereof and is surrounded by the side wall for each pair of cells which are formed on opposite sides of the partition.

4. The tile of claim 3 in which each of the partitions has two openings therethrough which lies between the upper and lower edges thereof and is surrounded by the side wall for each pair of cells which are formed on opposite sides of the partition, said two openings being spaced in a direction parallel to the direction in which the cells extend through the tiles.

5. The tile of claim 4 in which each of the side walls has two openings therethrough which lies between the upper and lower edges thereof and is surrounded by the side wall for each of the cells formed by that side wall, said two openings being spaced apart in a direction parallel to the direction in which the cells extend through the tiles.

6. The tile of claim 5 in which each of the cells has dimensions of about 2⅛ inches by about 2⅛ inches and each of the openings in the partitions and the side walls has a diameter of about two inches.

7. The tile of claim 6 in which the cell has a height of about six inches.

8. The tile of claim 1 in which each of the side walls has two openings therethrough which lies between the upper and lower edges thereof and is surrounded by the side wall for each of the cells formed by that side wall, said two openings being spaced apart in a direction parallel to the direction in which the cells extend through the tiles.

9. The tile of claim 1 in which the upper edge of each of the side walls of each pair of side walls is provided with a plurality of notches between the side walls of the other pair.

10. The tile of claim 1 in which the lower edge of each of the side walls is tapered.

11. In a liquid cooling tower having a plurality of vertically stacked layers of rectangular clay tiles, each of the tiles having a first pair of parallel side walls having upper and lower edges and a second pair of parallel side walls having upper and lower edges which extend perpendicularly to said first pair, at least one partition which extends perpendicularly between the side walls of said first pair, and at least one partition which extends perpendicularly between the side walls of said second pair to provide a plurality of open cells which extend vertically through the tile, the tiles of each layer being offset from the tiles of adjacent layers so that the cells of the tiles in one layer are vertically aligned with side walls or partitions of tiles in adjacent layers, and liquid supply means above the stacked layers of tiles for supplying liquid to be cooled to the stacked tiles whereby liquid flows downwardly through the cells in the tiles, the improvement characterized by each of the side walls having at least one opening therethrough which lies between the upper and lower edges thereof and is surrounddd by the side wall for each of the cells which are formed by that side wall whereby air and liquid can flow substantially horizontally into and out of the cells through the openings in the side walls.

12. The structure of claim 11 in which each of the partitions has upper and lower edges and at least one opening therethrough which lies between the upper and lower edges thereof and is surrounded by the side wall for each pair of cells which are formed on opposite sides of the partition whereby air and liquid can flow into and out of the cells through the openings in the partitions.

13. The structure of claim 11 in which a cell at each corner of a tile partially overlaps a cell at a corner of a tile in the next lowermost layer.

14. The structure of claim 11 in which a pair of cells adjacent one corner of each tile partially overlap a pair of cells adjacent a corner of a tile in the next lowermost layer.

15. The structure of claim 11 in which a plurality of cells adjacent a corner of each tile partially overlap a plurality of cells adjacent a corner of a tile in the next lowermost layer.

16. The structure of claim 11 in which the upper edge of each side wall of each pair of side walls of each tile is provided with a plurality of notches between the side walls of the other pair, the lower edges of the side walls of each tile being positioned in notches of the tiles in the next lower layer.

17. The structure of claim 16 in which the lower edge of each side wall of each tile is tapered.

18. The structure of claim 11 in which at least two parallel partitions extend perpendicularly between the side walls of said first pair and at least two parallel partitions extend perpendicularly between the side walls of said second pair and intersect said first mentioned parallel partitions, each of the partitions having upper and lower edges and at least one opening therethrough which lies between the upper and lower edges thereof and is surrounded by the side wall for each of the cells which are formed on opposite sides of the partition.

19. The structure of claim 18 in which a cell at each corner of a tile partially overlaps a cell at a corner of a tile.

20. The structure of claim 11 in which at least two parallel partitions extend perpendicularly between the side walls of said first pair and at least two parallel partitions extend perpendicularly between the side walls of the second pair, each of the side walls of each tile having two vertically spaced openings therethrough which lies between the upper and lower edges thereof and is surrounded by the side wall for each of the cells formed by that side wall and each of the partitions of each tile having upper and lower edges and two vertically spaced openings therethrough which lies between the upper and lower edges thereof and is surrounded by the side wall for each of the cells which are formed by that partition.

21. The structure of claim 20 in which a cell at each corner of a tile partially overlaps a cell at a corner of a tile in the next lowermost layer.

22. The structure of claim 20 in which a pair of cells adjacent one corner of each tile partially overlap a pair of cells adjacent a corner of a tile in the next lowermost layer.

23. The structure of claim 20 in which a plurality of cells adjacent a corner of each tile partially overlap a plurality of cells adjacent a corner of a tile in the next lowermost layer.

24. The structure of claim 20 in which the upper edge of each side wall of each pair of side walls of each tile is provided with a plurality of notches between the side walls of the other pair, the lower edges of the side walls of each tile being positioned in notches of the tile in the next lower layer.

25. The structure of claim 24 in which the lower edge of each side wall of each tile is tapered.

* * * * *

UNITED STATES PATENT AND TRADEMARK OFFICE
CERTIFICATE OF CORRECTION

PATENT NO. : 4,481,155
DATED : November 6, 1984
INVENTOR(S) : Paul A. Frohwerk

It is certified that error appears in the above-identified patent and that said Letters Patent is hereby corrected as shown below:

Col. 6, line 31 delete "said" and insert --the side--.

Signed and Sealed this

Fourteenth Day of May 1985

[SEAL]

Attest:

DONALD J. QUIGG

*Attesting Officer*  *Acting Commissioner of Patents and Trademarks*